(12) United States Patent  (10) Patent No.: US 12,456,119 B2
Jiang et al.  (45) Date of Patent: Oct. 28, 2025

(54) METHOD AND SYSTEM FOR EVENT NOTIFICATION

(71) Applicant: Royal Bank of Canada, Toronto (CA)

(72) Inventors: Shangjia Jiang, Richmond Hill (CA); Chung Wing Ho, Vaughan (CA); Lara Sisa, Toronto (CA)

(73) Assignee: Royal Bank of Canada, Toronto (CA)

( * ) Notice: Subject to any disclaimer, the term of this patent is extended or adjusted under 35 U.S.C. 154(b) by 162 days.

(21) Appl. No.: 18/447,091

(22) Filed: Aug. 9, 2023

(65) Prior Publication Data

US 2024/0054487 A1 Feb. 15, 2024

Related U.S. Application Data

(60) Provisional application No. 63/396,447, filed on Aug. 9, 2022.

(51) Int. Cl.
*G06Q 20/38* (2012.01)

(52) U.S. Cl.
CPC ......... *G06Q 20/386* (2020.05); *G06Q 20/389* (2013.01)

(58) Field of Classification Search
CPC ............... G06Q 20/386; G06Q 20/389; G06Q 20/4016
See application file for complete search history.

(56) References Cited

U.S. PATENT DOCUMENTS

| | | | | |
|---|---|---|---|---|
| 6,535,855 | B1 * | 3/2003 | Cahill | G06Q 20/00 705/346 |
| 7,577,712 | B1 * | 8/2009 | Ramannavar | G06F 9/546 711/101 |
| 7,945,813 | B1 * | 5/2011 | Watson | G06F 11/1443 714/17 |
| 8,028,087 | B2 * | 9/2011 | Reed | H04L 67/63 709/201 |
| 8,510,473 | B1 * | 8/2013 | Leonard | H04L 51/066 709/245 |
| 9,753,802 | B1 * | 9/2017 | Shipilov | G06F 11/1443 |
| 10,142,430 | B1 * | 11/2018 | Onnen | H04L 67/52 |
| 10,375,010 | B1 * | 8/2019 | Ranjan | H04L 51/56 |
| 11,115,365 | B1 * | 9/2021 | Dwarakanathan | H04L 41/0895 |

(Continued)

OTHER PUBLICATIONS

@jason "Best Practices for Event-Driven Microservice Architecture" < URL: https://hackernoon.com/best-practices-for-event-driven-microservice-architecture-e034p21lk >, Hackernoon, Sep. 18, 2019.

(Continued)

*Primary Examiner* — Jared M Bibbee

(57) ABSTRACT

Methods, systems, and techniques for event notification. An event, such as a payment event that represents a payment transaction having been initiated, completed, or that the transaction is in progress, results in an event engine sending an upstream message to one or more servers. The one or more servers receive the upstream message, which is in a first format. The one or more servers convert the upstream message into a downstream message that is in a second format, such as an ISO 20022 format, and the downstream message is subsequently consumed by an event consumer. The event consumer may consume the downstream message in real-time relative to when the event occurs. Undelivered upstream or downstream messages may be stored in a dead letter channel repository for attempted redelivery.

20 Claims, 12 Drawing Sheets

(56) References Cited

U.S. PATENT DOCUMENTS

| | | | | |
|---|---|---|---|---|
| 11,552,979 | B1* | 1/2023 | Soudhamma | H04L 45/22 |
| 2007/0079168 | A1* | 4/2007 | Sivakumar | H04L 43/0817 |
| | | | | 714/1 |
| 2015/0264064 | A1* | 9/2015 | Gerard | H04L 63/1408 |
| | | | | 726/22 |
| 2016/0191714 | A1* | 6/2016 | Johan | H04M 11/04 |
| | | | | 370/354 |
| 2018/0330380 | A1* | 11/2018 | Sundaram P | G06Q 20/308 |
| 2023/0305896 | A1* | 9/2023 | Wood | H04L 9/0894 |

OTHER PUBLICATIONS

Jorge Quilcate "The Importance of Distributed Tracing for Apache Kafka Based Applications" < URL: https://www.confluent.io/blog/importance-of-distributed-tracing-for-apache-kafka-based-applications/ >, Confluent, Mar. 26, 2019.

Chris Richardson "Pattern: Command Query Responsibility Segregation (CQRS)" <URL: https://microservices.io./patterns/data/cqrs.html> Microservice Architecture, 3 pages, retrieved from Internet Archive Wayback Machine <https://web.archive.org/web/20230525015047/https://microservices.io./patterns/data/cqrs.html>, time stamped May 25, 2023.

Chris Richardson "Pattern: Event sourcing" <URL: https://microservices.io/patterns/data/event-sourcing.html> Microservice Architecture, 4 pages, retrieved from Internet Archive Wayback Machine <https://web.archive.org/web/20230711172252/https://microservices.io/patterns/data/event-sourcing.html>, time stamped Jul. 11, 2023.

"Store and forward" < URL: https://en.wikipedia.org/wiki/Store_and_forward > Wikipedia, as revised Mar. 24, 2022.

* cited by examiner

METHOD AND SYSTEM FOR EVENT NOTIFICATION

CROSS-REFERENCE TO RELATED APPLICATION

This application claims priority to U.S. provisional application No. 63/396,447, filed on Aug. 9, 2022 and entitled, "Method and System for Event Notification", the entirety of which is hereby incorporated by reference herein.

TECHNICAL FIELD

The present disclosure is directed at methods, systems, and techniques for event notification, including event notification in real-time.

BACKGROUND

Events, such as electronic payments, may occur on a variety of systems and in a variety of contexts. For example, even in the limited context of electronic payments, different types of events may exist (e.g., an electronic funds transfer between two individuals, a retail electronic payment), they may occur on different computer systems, and those computer systems may communicate information regarding those events with messages using different message formats.

Additionally, different parties may be interested in receiving the messages regarding those events in different ways. For example, a cybersecurity department may be interested in obtaining event-related information to periodically audit system security, and consequently may not need event information in real-time. In contrast, an individual may desire real-time notifications to be displayed on their phone or computer. In this example, the cybersecurity department and the individual's phone or computer may also be configured to accept event notification messages in different formats, both of which may be different from the message format used by the computer system on which the event occurred to transmit the event-related information.

SUMMARY

According to a first aspect, there is provided a method comprising: receiving an upstream message in a first format from an event engine, wherein the upstream message is sent in response to an event occurring at the event engine; converting the upstream message from the first format into a downstream message in a second format that is different from the first format; and sending the downstream message to an event consumer.

The event may comprise a payment event.

Sending the downstream message to the event consumer may comprise: transferring the downstream message to a Kafka topic; and in response to a request from the event consumer, sending the downstream message from the Kafka topic to the event consumer.

Receiving the upstream message may comprise receiving the upstream message via an application programming interface.

The downstream message may comprise an event header and event entity data.

The event entity data may comprise an ISO 20022 message and state specific data.

The event entity data may comprise an entity payload, state specific data, reference data, and channel context data.

Sending the downstream message to the event consumer may comprise: making an unsuccessful attempt to send the downstream message; storing the downstream message in a dead letter channel repository; automatically performing a task to deliver the downstream message, wherein performing the task comprises retrieving the downstream message from the dead letter channel repository and updating a status of the downstream message in the dead letter channel repository; and successfully delivering the downstream message by completing performance of the task.

The downstream message may be consumed in real-time by the event consumer.

Converting the event may be performed using a mapping library.

The event may be an initiated state event, an intermediate state event, or a final state event.

According to another aspect, there is provided a method for event notification, the method comprising: receiving an upstream message corresponding to an event in a first format from an event engine, wherein the upstream message is sent in response to the event being processed by the event engine; converting the upstream message from the first format into a downstream message in a second format that is different from the first format; and delivering the downstream message to an event consumer, wherein after receiving the upstream message from the event engine and before delivering the downstream message to the event consumer, the method further comprises: encountering an error in processing at least one of the upstream message or the downstream message, or being unable to identify the event that corresponds to the upstream message; in response to the error, storing the at least one of the upstream message or the downstream message in a dead letter channel repository; and subsequent to the storing, retrieving the at least one of the upstream message or the downstream message from the dead letter channel repository to respectively perform at least one of the converting of the upstream message or the delivering of the downstream message.

The event may be a payment event, for example.

The error may be encountered in processing the upstream message or the event that corresponds to the upstream message is unable to be identified, the upstream message may be stored in the dead letter channel repository, and the upstream message may be retrieved from the dead letter channel repository subsequent to the storing.

The error may be encountered in processing the downstream message, the downstream message may be stored in the dead letter channel repository, and the downstream message may be retrieved from the dead letter channel repository subsequent to the storing.

The method may further comprise: in response to the error, storing metadata in the dead letter channel repository identifying an application programming interface endpoint used to initially attempt delivery of the downstream message; subsequent to the storing, retrieving the metadata identifying the application programming interface endpoint used to initially attempt delivery of the downstream message, wherein the downstream message is delivered to the event consumer using the application programming interface endpoint.

The error may be encountered in processing the upstream message or the event that corresponds to the upstream message is unable to be identified; the error may be encountered in processing the downstream message; the upstream and downstream messages may be both stored in the dead letter channel repository; and the upstream and downstream messages may be both retrieved from the dead letter channel repository subsequent to the storing.

The method may further comprise automatically and intermittently determining whether any undelivered messages are present in the dead letter channel repository, and the at least one of the upstream message or downstream message may be retrieved from the dead letter channel repository following identifying the at least one of the upstream message or downstream message in the dead letter channel repository in response to the automatic and intermittent determining.

The dead letter channel repository may store a plurality of undelivered messages and metadata identifying each of the plurality of undelivered messages as being undeliverable because of a retryable error or a non-retryable error, and the method may further comprise determining that the error is a retryable error prior to retrieving the at least one of the upstream message or downstream message from the dead letter channel repository.

Storing the at least one of upstream message or downstream message in the dead letter channel repository may comprise sending the at least one of the upstream message or downstream message to the dead letter channel repository from respective upstream and downstream content-based routers, and retrieving the at least one of the upstream message or downstream message from the dead letter channel repository may comprise sending the at least one of the upstream message or downstream message to the upstream and downstream content-based routers, respectively, from the dead letter channel repository.

The method may further comprise updating metadata stored in the dead letter channel repository describing a status of the at least one of the upstream message or downstream message and a number of times re-delivery of the at least one of the upstream message or downstream message has been attempted.

The downstream message may comprise a push notification, and the method may further comprise generating another event in response to delivery of the push notification.

According to another aspect, there is provided a system for event notification comprising: at least one processor; at least one network interface communicatively coupled to the at least one processor; and at least one non-transitory computer readable medium communicatively coupled to the processor and having stored thereon computer program code that is executable by the at least one processor, wherein the computer program code when executed causes the at least one processor to perform any of the foregoing aspects of the method or suitable combinations thereof. The upstream and downstream messages may be received or delivered using the at least one network interface.

According to another aspect, there is provided at least one non-transitory computer readable medium having stored thereon computer program code that is executable by at least one processor and that, when executed by the at least one processor, causes the at least one processor to perform any of the foregoing aspects of the method or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
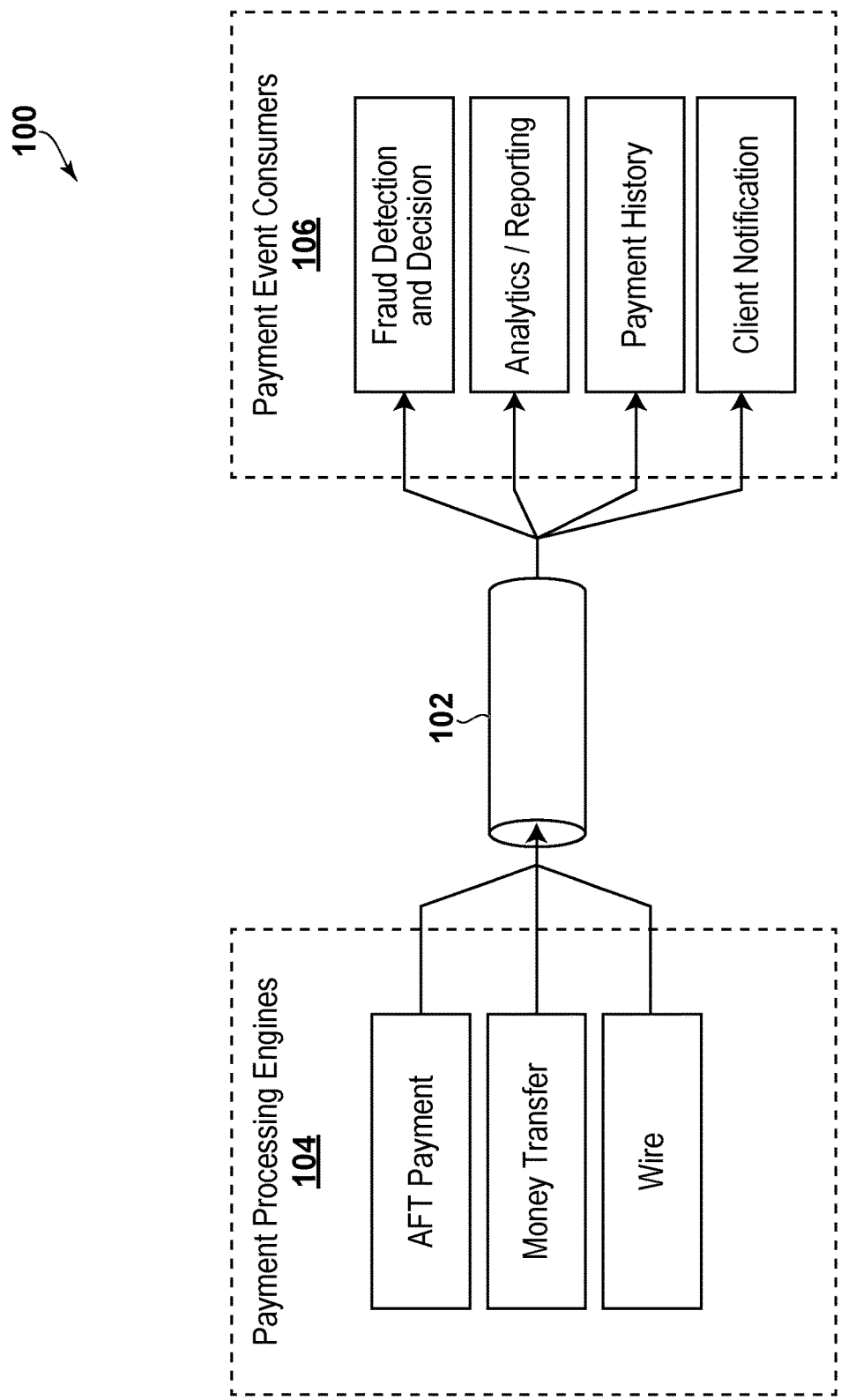
FIG. 1 depicts a block diagram of an event notification system, according to an example embodiment.

Referring now to FIG. 1, there is shown a block diagram of an event notification system 100. The event notification system 100 comprises one or more servers 102 (hereinafter simply "servers 102") that are communicatively coupled to event engines 104 upstream of the server 102 and event consumers 106 downstream of the servers 102. In response to an event occurring at one of the event engines 104, such as a payment transaction occurring, the event engine 104 sends one or more upstream messages to the servers 102, which process and send in real-time one or more downstream messages based on the one or more upstream messages to one or more of the event consumers 106. The one or more downstream messages received by the one or more of the event consumers 106 respectively constitute "event notifications" to the one or more event consumers that the event has occurred at the event engine 104. The servers 102 accordingly implement a microservices architecture in which they manage "event flows" from the event engines 104 to the event consumers 106, and in which the downstream messages sent from the servers 102 to the event consumers 106 can benefit from processing done on the upstream messages by the servers 102. As discussed further below, the servers 102 may perform for example content-based routing or pluggable data mapping; they may support different upstream (with the event engines 104) and downstream (with the event consumers 106) protocols; and they may facilitate data resiliency and recovery.

Each of the event engines 104, servers 102, and event consumers 106 may comprise an example computer system such as that depicted in respect of FIG. 9, below. As discussed further in respect of FIG. 6 below, the servers 102 leverage a technology stack comprising Apache Camel™ for event routing; Apache Kafka™ for messaging with the event engines 104 and event consumers 106; MapStruct™ to create the message formats such as those described in respect of FIGS. 7A and 7B below; and Springboot™ and Pivotal Cloud Foundry™ ("PCF") to implement the system 100 as an on-premises cloud platform.

As shown in FIG. 1 and as described further below, the events generated by the event engines 104 may be payment-related (e.g., wire transfers via the SWIFT network, payments via automated fund transfer ["AFT"], any money transfers between personal or business bank accounts). Similarly, the event consumers 106 may accordingly make use of payment-related data contained in the messages from the servers 102, such as for fraud detection and decision-making, analytics and reporting, payment histories, and end user/client notifications. However, in at least some embodiments the events may be unrelated to payments.

Event flows may be used, for example, to implement the following functionality:

1. Payment lifecycle event notifications from event engines 104 used for payment. Different types of payment events may occur at multiple of the event engines 104, resulting in different types of upstream messages being sent to the servers 102. The servers 102 may adjust the format of the upstream messages and republish them in the form of downstream messages sent to the event consumers 106 to consume.

2. Push notifications. The servers 102 may provide application programming interface ("API")-based endpoints for the event engines 104 to push event notifications, such as payment and fraud-related event notifications, to the event consumers 106. API-based endpoints may be consumed by any HTTP client, with a benefit of using API-based endpoints being that they may handle multiple API requests concurrently as opposed to sequentially, and that the capacity of the API-based endpoints to handle inbound requests may be scaled by adding threads and memory. The servers 102 may leverage Apache Kafka™ topics as a data repository or buffer to store and forward downstream messages to the event consumers 106 without creating dependencies on the event engines 104 that sent the upstream messages to the servers 102.

3. Client notification events. The servers 102 may filter certain events that may be interesting to event consumers 106 in the form of clients so that downstream messages corresponding to those events may be forwarded to clients using the clients' preferred notification methods and message formats. Client notification events are a subset of the payment lifecycle event notifications described above in point 1.

Figure 2A:
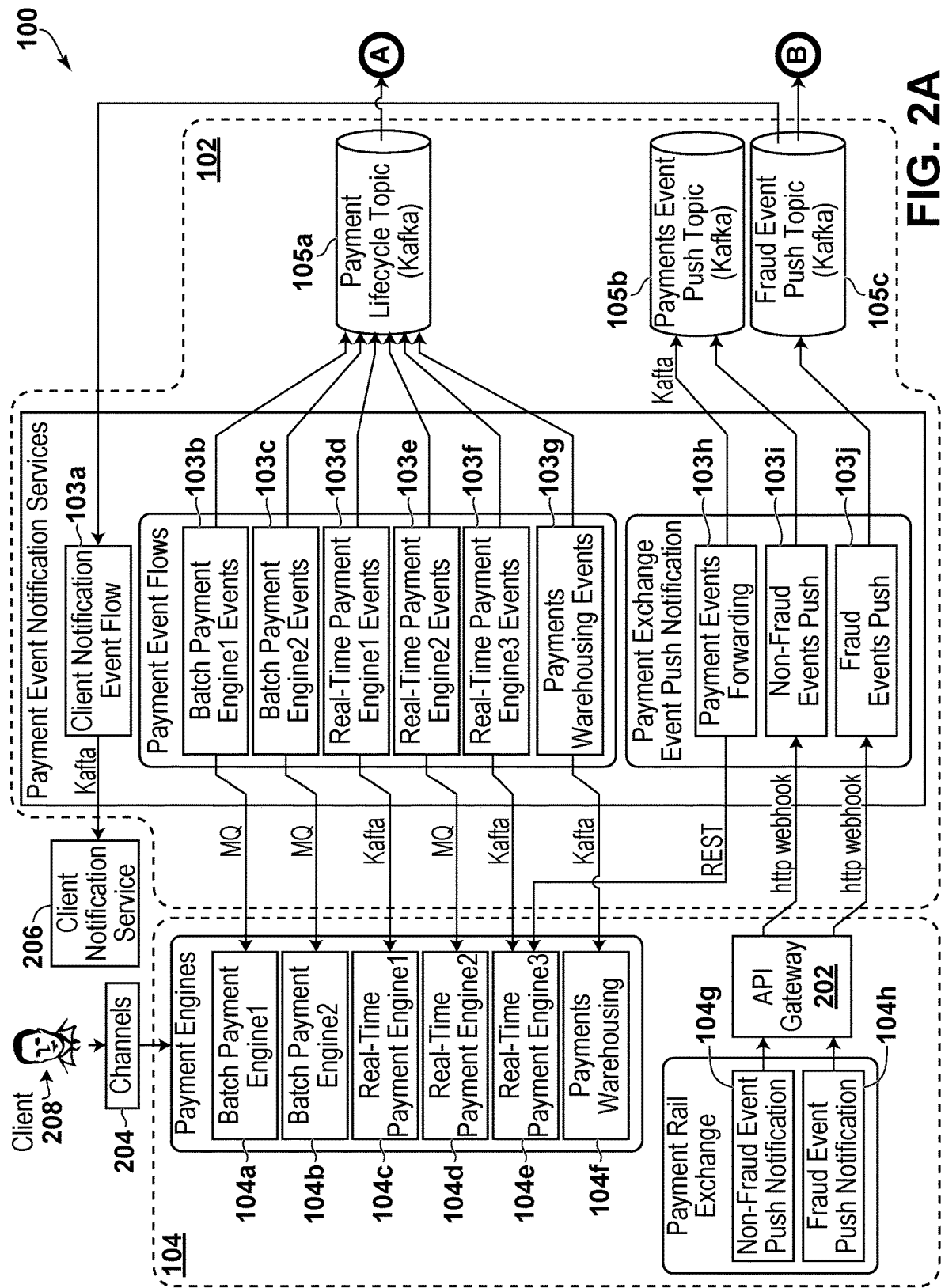
FIGS. 2A and 2B depict a block diagram of the event notification system of FIG. 1, according to an example embodiment.
Figure 2B:
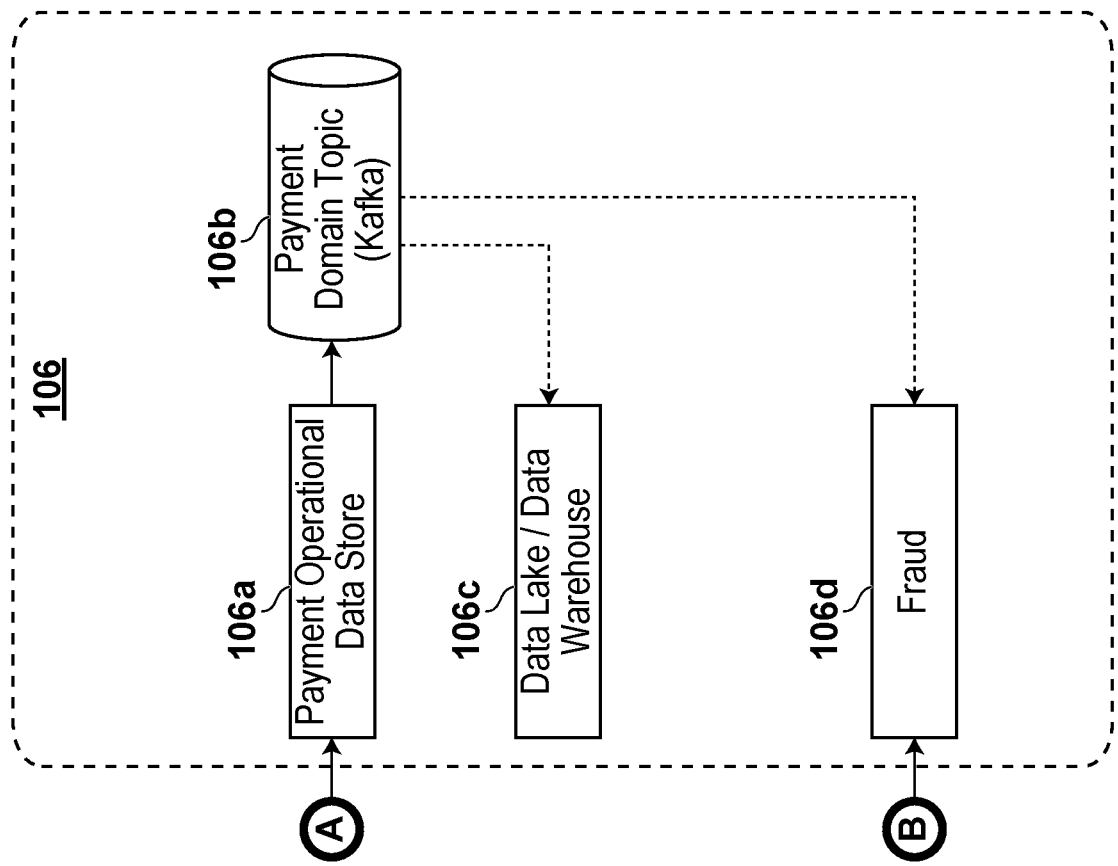

Referring now to FIGS. 2A and 2B, there is shown a block diagram of the event notification system 100, according to an example embodiment. As in FIG. 1, in FIGS. 2A and 2B the servers 102 are communicatively coupled to and downstream of the event engines 104, and to and upstream of the event consumers 106. FIGS. 2A and 2B depict first through eighth event engines 104a-h that collectively comprise the event engines 104 as represented in FIG. 1. The first and second event engines 104a,b are for batch payment (i.e., each upstream message contains information on a batch of payments); the third through fifth event engines 104c-e are for real-time payments (i.e., each upstream payment is sent in real-time in response to a payment event occurring); the sixth event engine 104f is for payments warehousing (e.g., managing/storing, and scheduling post-dated and recurring payments); the seventh event engine 104g is for non-fraud events; and the eighth event engine 104h is for fraud events. The first through sixth event engines 104a-f send upstream messages in response to pull requests from the servers 102, while the seventh and eighth event engines 104g,h push upstream messages to the servers 102; however, in different embodiments (not shown) any of the upstream messages may be pushed to or pulled by the servers 102.

Example events generated by the event engines 104a-h include that a transaction has been received by one of the engines 104a-h, that a transaction has been successfully sent to an interbank network, and that a transaction has been cancelled. Clients 208 interact with the first through sixth event engines 104a-f via channels 204, examples of which comprise a retail channel (e.g., by making a credit or debit retail purchase), a commercial channel (e.g., a B2B transaction), and a small business channels (e.g., a B2B transaction specifically between two small businesses).

The servers 102 run second through tenth event processes 103b-j to process different types of events from the first through eighth event engines 104a-h. Namely, the second and third event processes 103b,c respectively receive batch payment events from the first and second event engines 104a,b; the fourth through sixth event processes 103d-f respectively receive real-time payment events from the third through fifth event engines 103c-e, and the eighth event process 103h also receives real-time payment events from the fifth event engine 103e; the seventh event process 103g receives payment warehousing events from the sixth event engine 104f; and the ninth and tenth event processes 103i,j respectively receive push events from the seventh and eighth event engines 104g,h. As used herein, the servers 102 "receiving" an event from the event engines 104 refers to the servers 102 receiving upstream messages representative of events from the event engines 104 or the client notification service 206, while the servers 102 "sending" an event to the event consumers 106 refers to the servers 102 sending messages representative of events downstream.

More particularly, as discussed further below the second through seventh event processes 103b-g receive events in the form of upstream messages from the first through sixth event engines 104a-f and transform them into an appropriate International Organization for Standardization ("ISO") formatted downstream message for sending to associated Kafka™ topics; and the eighth though tenth event processes 103h-j receive events that represent notifications in the form of upstream messages from the fifth, seventh, and eighth event engines 104e,g,h, filters those notifications to the ones relevant for clients, and pushes downstream messages corresponding to those filtered notifications. As shown in FIGS. 2A and 2B, various message formats, such as Kafka™, MQ, HTTP webhooks, and representational state transfer ("REST") may be used to communicate between the processes 103b-1 and the engines 104a-h.

As mentioned above, the servers 102 also comprise data stores in the form of first through third Kafka™ topics 105a-c, respectively designed to receive and store Kafka™ messages from the event processes 103b-j in respect of payment lifecycle, payment events, and fraud events. The event processes 103b-j receive the upstream messages, which in FIGS. 2A and 2B are in webhook, Kafka, REST, or MQ formats, and converts them to downstream Kafka™ messages for storing in the Kafka™ topics 105a-c until required by the event consumers 106 discussed below.

The seventh and eighth event engines 104g,h in respect of push notifications communicate with the ninth and tenth event processes 103i,j via a B2B API gateway 202, such as an Apigee™ gateway.

The first event process 103a for processing retail client notification events sends Kafka™ messages to the client notification service in FIGS. 2A and 2B that subsequently sends corresponding notifications to clients via, for example, e-mail, mobile applications, and text messages.

The event consumers 106 in FIGS. 2A and 2B comprise first through fourth event consumers 106a-d. Namely, the first through fourth event consumers 106a-d respectively comprise a database for storing payment operational data store events for business reporting purposes; a Kafka™ topic for storing payment domain events that can be used to display payment history; a consumer that stores the events for business reporting; and a consumer that uses the events to receive transactional updates to accordingly assess whether a transaction is fraudulent.

Figure 3:
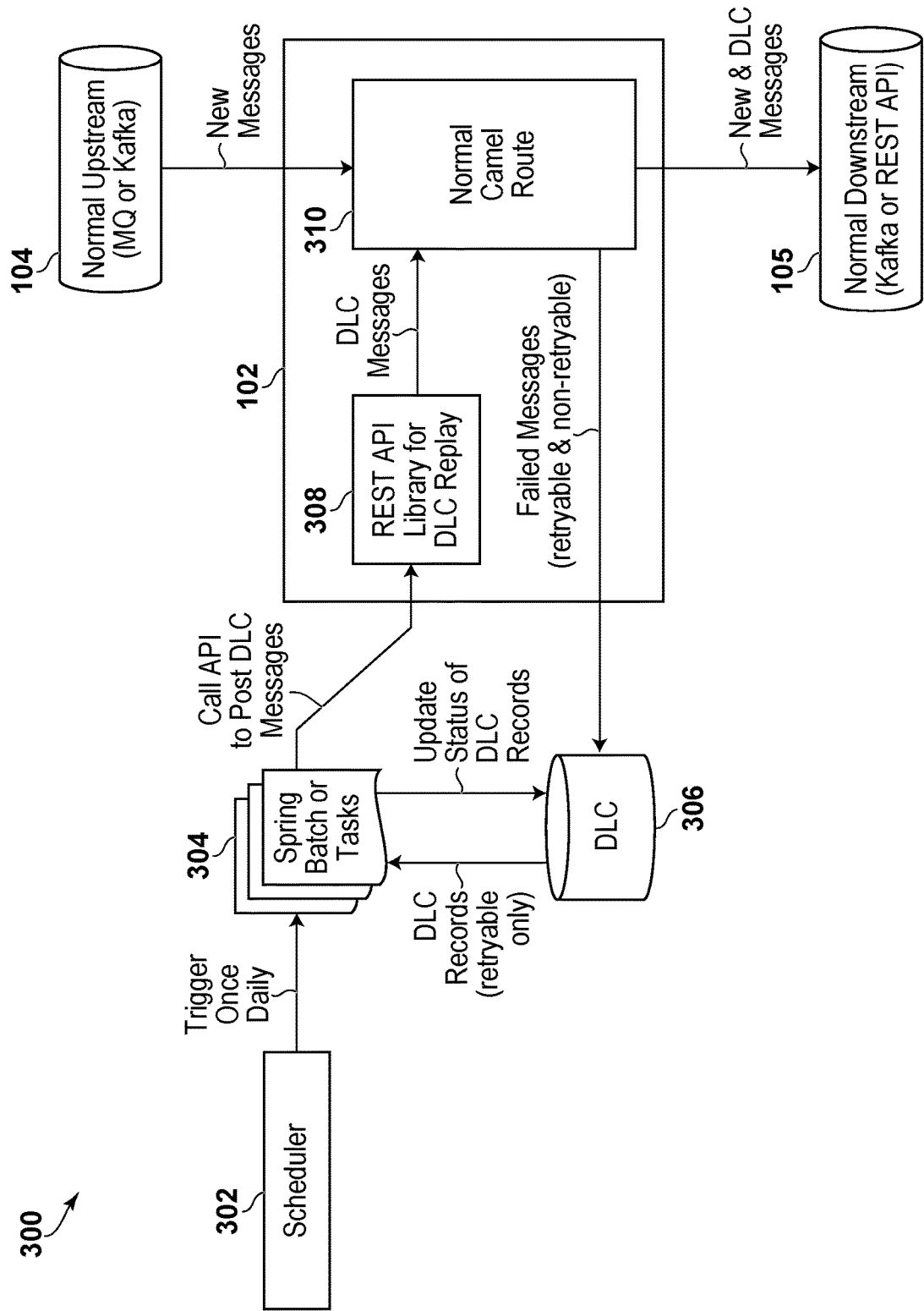
FIG. 3 depicts a block diagram of an event retry system, comprising part of the event notification system of FIG. 1.

Referring now to FIG. 3, there is depicted a block diagram of an event retry system 300, which in at least some embodiments may comprise part of the event notification system 100 of FIG. 1. More particularly, in the event notification system 100, event flows (i.e., the sending of events from their respective sources to the event consumers 106, which comprises generating and sending the upstream and downstream messages) occur along event pipelines that act as stateless and high throughput event streaming processes. As part of implementing the event pipelines, the servers 102 consume or pick up an event from one or more of the event engines 104, process (e.g., transform/map or stitch) the events, route them, and publish them to the appropriate data store, such as the Kafka™ topics 105a-c. If normal operation in an event pipeline is interrupted for whatever reason, an event may not be published to the data store and data loss may occur. For example, when an event occurs at the seventh or eighth event engines 104g,h, the event flow may comprise calling an API via the API gateway 202 to obtain remittance data and to stitch the data to the original upstream message from the seventh or eighth event engines 104g,h regarding the payment event, following which the event is published to the second or third Kafka™ topic 105b,c for subsequent use by the fourth event consumer 106d. If the API gateway 202 is unavailable for whatever reason, the event cannot be published in real-time and has to be retried at a later time or else the event may be lost to the event consumer 106d. The event retry system 300 is accordingly configured to retry the event.

As shown in FIG. 3, during normal operation an event may occur upstream at one of the event engines 104. In the normal course, it is routed by the servers 102 via a framework 310, such as the Apache Camel™ framework, downstream to one or more of the event consumers 106. However, the framework 310 may be unable to process some of the events ("failed events"). For example, a failed event may result if, when attempting to deliver a message, the Kafka™ topic or broker associated with that message is temporarily unavailable. Another reason a failed event may occur is, when processing a message requires calling an API to perform a particular task (e.g., to stitch event data), the API is temporarily unavailable. Messages that the framework 310 is unable to send to the one or more event consumers 106 that correspond to the failed events are saved by the framework 310 in a dead letter channel ("DLC") repository 306. The DLC repository 306 may be implemented, for example, as a MongoDB™ database. The messages are stored in the DLC repository 306 regardless of whether they can be retried later.

A scheduled batch job periodically fetches messages corresponding to the failed events from the DLC repository 306 to retry delivery of those messages that can be retried. The messages stored in the DLC repository 306 may be upstream messages (i.e., messages before format conversion) or downstream messages (i.e., message after format conversion). More particularly, the event retry system 300 comprises a scheduler 302 that periodically performs a batch of tasks 304. For example, the scheduler 302 may be configured to perform the tasks once daily. One of the tasks 304 may be to obtain from the DLC repository 306 one of the messages corresponding to one of the failed events and to attempt to re-send it to the appropriate downstream event consumer 106. Upon retrieving that message from the DLC repository 306, the task 304 updates the status of that message in the DLC repository 306 to reflect the fact that delivery of that message is to be re-attempted, and attempts to re-send that message by calling a webhook via a REST API 308 used during the original event flow when that message could not be delivered. The webhook, or more generally any type of API endpoint, used during the initial attempted delivery of that message may be stored in the DLC repository 306 to be retrieved and used when delivery is re-attempted. As shown in FIG. 3, the framework 310 receives that message and attempts re-delivery. If re-delivery is successful, that message is delivered to the proper one of the event consumers 106. If not, it is re-sent to the DLC repository 306. Another re-delivery attempt may subsequently be made, either automatically via the scheduler 302 and one of the tasks 304, or manually.

Figure 4A:
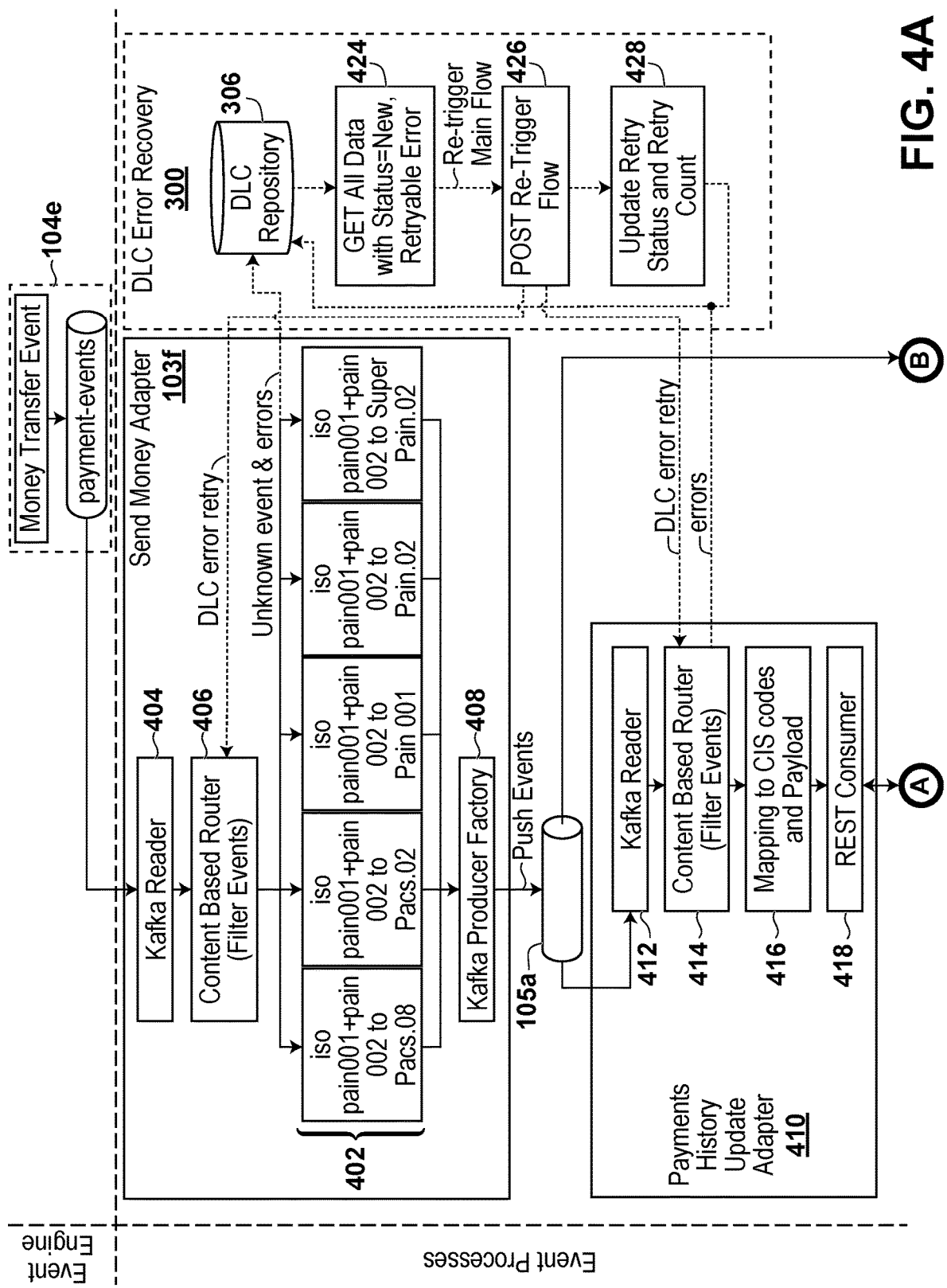
FIGS. 4A, 4B, 5A, and 5B depict various example event flows performed using the event notification system of FIG. 1.
Figure 4B:
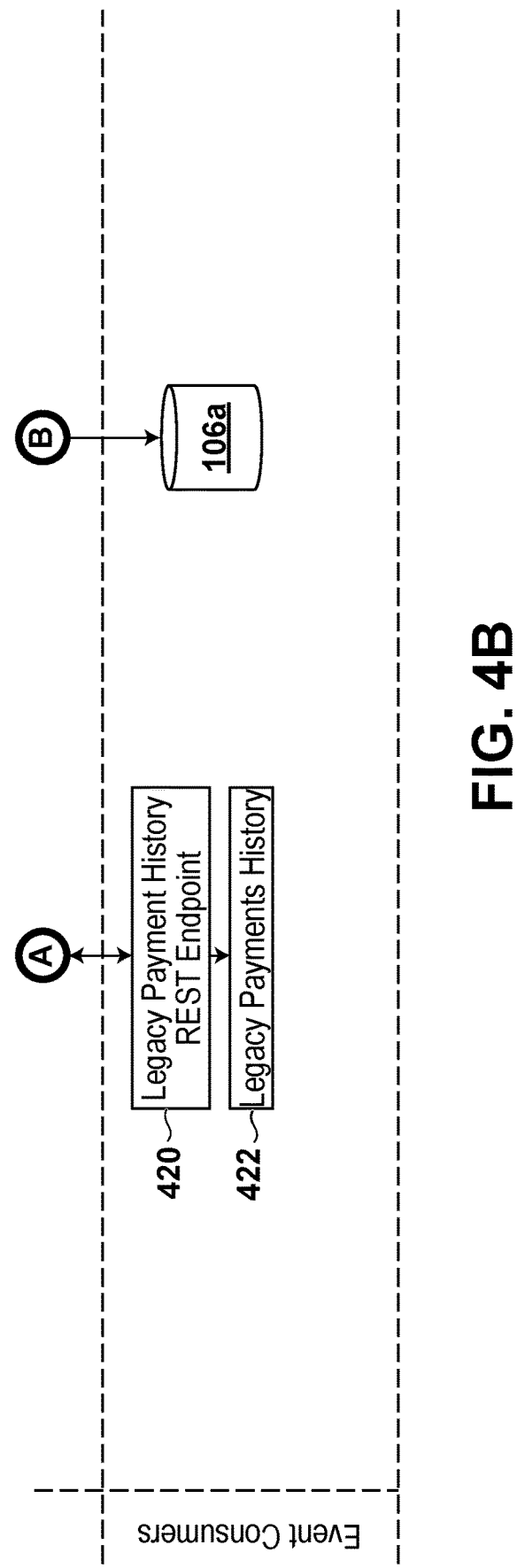

Referring now to FIGS. 4A and 4B, there is depicted an example event flow performed using the event notification system 100 of FIG. 1. In FIGS. 4A and 4B, the event flow begins with an event at the fifth event engine 104e. The event emitted by the fifth event engine 104e is for key payment state changes, such as a money transfer. As shown in FIG. 2, the upstream message generated as a result of that event is sent from the fifth event engine 104e to the sixth event process 103f that transforms it into a suitable format for a downstream message. The sixth event process 103f standardizes and republishes the event to the first Kafka™ topic 105a, which subsequently makes the event available to downstream consumers 106. More particularly, the sixth event process 103f transforms the upstream message using one or more message converters and sends it to the first Kafka™ topic 105a, which subsequently pushes downstream messages to the first event consumer 106a.

In the example of FIGS. 4A and 4B, the fifth event process 103f comprises an adapter that itself comprises a Kafka™ reader 404 that receives the upstream messages from the fifth event engine 104e; an upstream content-based router 406 that receives the upstream messages from the Kafka™ reader 404; and message converters 402 that receives the upstream messages routed by the upstream content-based router 406. The message converters 402 are for converting the upstream messages into downstream messages. The converters 402 may be plugged in to or swapped out from the adapter depending on the format of the upstream messages and the desired format of the downstream messages. For example, and as shown in FIGS. 4A and 4B, the converters 402 may be used to convert the upstream messages into downstream messages formatted in accordance with ISO 20022 formats (e.g., pain001, pain002, pacs002). The downstream messages are sent to a Kafka™ producer factory, which sends the downstream messages to the first Kafka™ topic 105a. The first event consumer 106a receives downstream messages from the first Kafka™ topic 105a.

While not shown in FIGS. 2A and 2B, the embodiment of FIGS. 4A and 4B also comprises a payments history update adapter 410 that also receives downstream messages from the first Kafka™ topic 105a. The payments history update adapter 410 comprises a Kafka™ reader 412 that receives downstream messages from the first Kafka™ topic 105a, a downstream content-based router 414 that receives the downstream messages from the Kafka™ reader 412, a mapping process 416 that maps the content of the downstream messages in accordance with an intended payload; and a REST consumer process 418 that makes the downstream messages available for consumption. A REST endpoint 420 provides access to the downstream messages, and a payments history process 422 obtains the downstream messages via the REST endpoint 420.

FIGS. 4A and 4B also depict the event retry system 300 communicative with the content-based routers 406,414 of the sixth event process's 103*f* adapter and the payments history update adapter 410. More particularly and as shown in FIGS. 4A and 4B, each of the content-based routers 406,414 is communicatively coupled to the DLC repository 306. The upstream content-based router 406 is configured to route to the DLC repository 306 those upstream messages that cannot be converted to downstream messages and delivered (i.e., upstream messages that correspond to failed events), while the adapter's 410 content-based router is configured to route to the DLC repository 306 those downstream messages that encounter a delivery error. For example, if the REST endpoint 420 is unavailable, the REST consumer process 418 may immediately attempt to retry delivery by calling the REST endpoint 420 again; if the REST endpoint 420 remains unavailable, the downstream content-based router 414 sends the downstream message to the DLC repository 306 for a future attempt at re-delivery.

Each of the content routers 406,414 is also communicatively coupled to a retry process 426 that itself is communicatively coupled to the DLC repository 306 to receive messages for re-delivery, as described above in respect of FIG. 3. Namely, a data retrieval process 424 periodically retrieves from the DLC repository 306 the messages corresponding to failed events. The messages for which delivery is to be retried may be tagged with metadata indicating this. In the example of FIGS. 4A and 4B, the data retrieval process 424 is run daily, and retrieves from the DLC repository 306 those tagged with metadata indicating they are "New" (i.e., delivery has not yet been retried for those messages) and that their initial delivery failed due to a "Retryable Error" (i.e., the messages are in the DLC repository 306 because of an error that may have been transient and now over, such as an API endpoint presumably being only temporarily unavailable or a timed out response from a downstream consumer 106, and thus a retry is warranted. In contrast to a retryable error, a "non-retryable error" is an error that does not resolve with the passage of time, and thus no attempt at re-delivery is warranted. For example, a message may be formatted incorrectly or otherwise invalid; as an error in the message itself does not remedy itself with time, it is treated as a non-retryable error.

Messages affected by retryable errors and for which delivery is retried are relayed to the retry process 426, which routes the messages to the appropriate content-based router 406,414, depending on the original source of the messages. The content-based routers 406,414 then attempt re-delivery of those messages as described above in respect of FIG. 3. After the retry process 426 executes, an update process 428 updates the retry status and retry count metadata in the DLC repository 306 for the messages for which delivery was retried. For example, those messages for which delivery was retried would have their status in the DLC repository 306 changed from "New" (i.e., delivery had not been retried) to "Retry attempted once". Collectively, the data retrieval process 424, retry process 426, and update process 428 implement the functionality described in respect of the scheduler 302 and tasks 304 of FIG. 3.

Figure 5A:
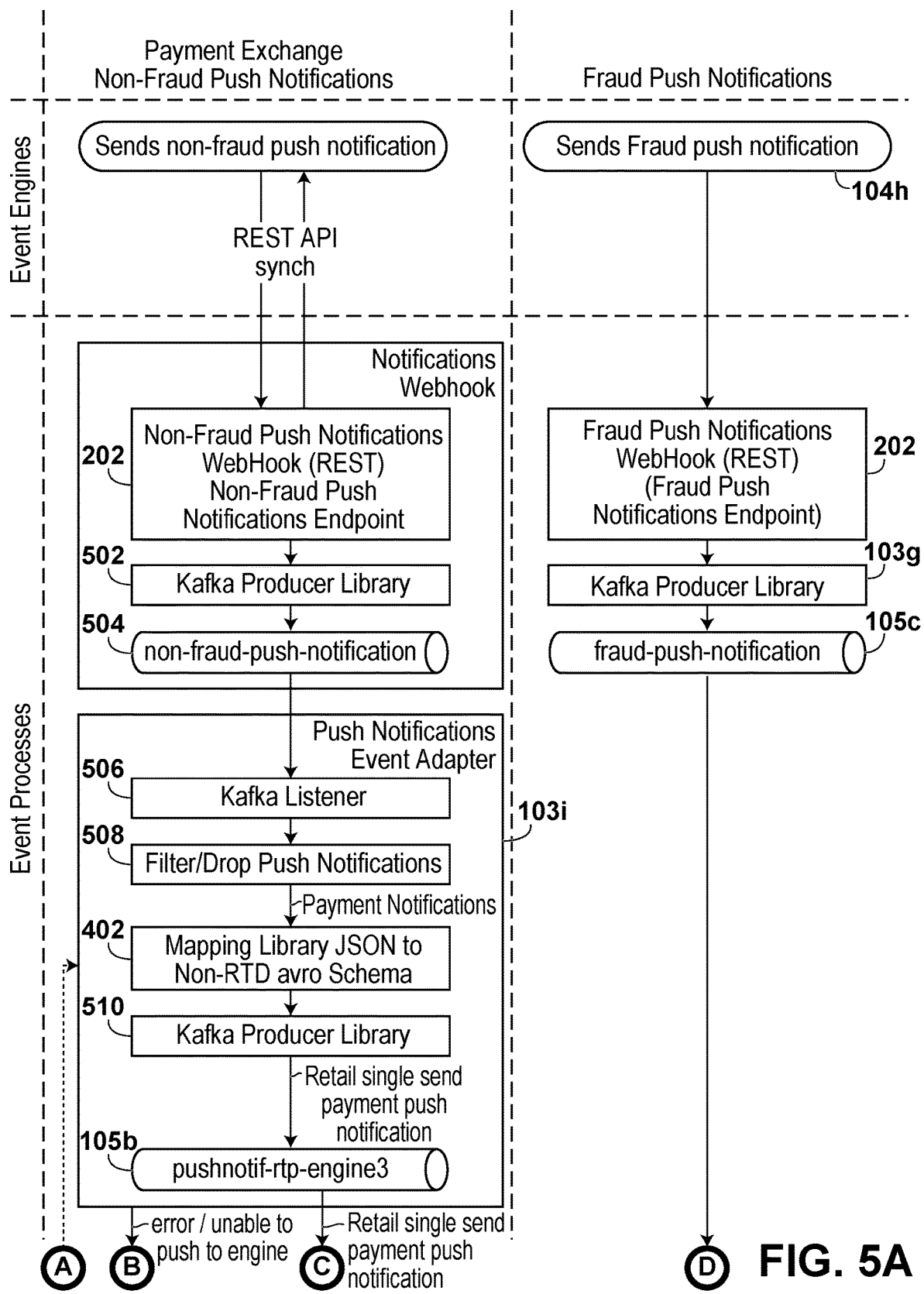
Figure 5B:
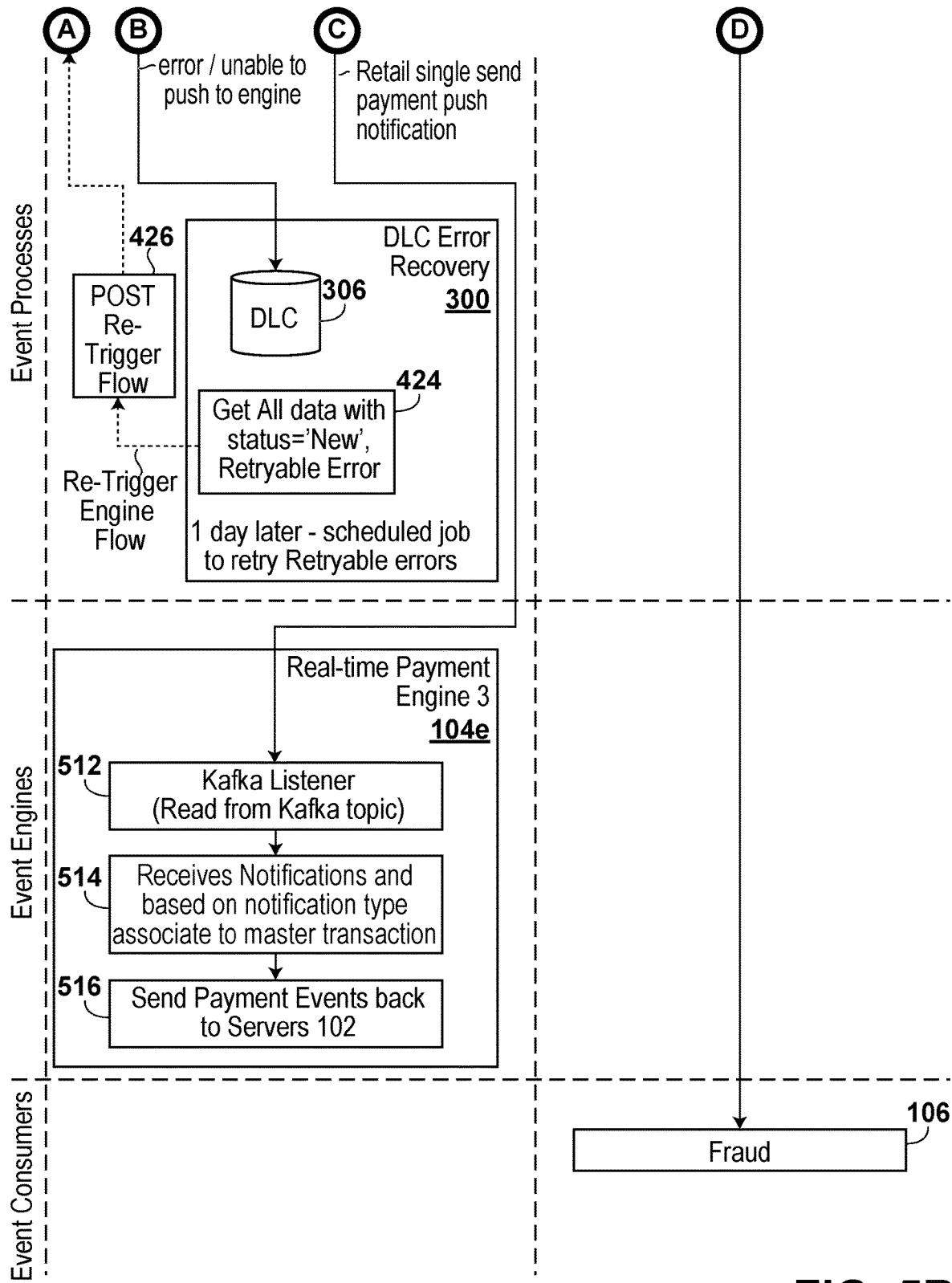

Referring now to FIGS. 5A and 5B, there are depicted additional example event flows performed using the event notification system 100 of FIG. 1. FIGS. 5A and 5B depict example events that may be performed in conjunction with an electronic transfer payment facilitated by a payment exchange solutions provider. The exchange solutions provider receives an electronic transfer payment, processes the payment, and sends the payment to the recipient financial institution acting as a creditor agent to clear. The status of the exchanging and clearing process is communicated to the sender financial institution acting as the debtor agent by the payment exchange solutions provider via the events depicted in FIGS. 5A and 5B.

Namely, FIGS. 5A and 5B depict two event flows: one that commences with an event in the form a fraud push notification ("fraud push notification event") and another that commences with an event in the form of a non-fraud push notification ("non-fraud push notification event"). The fraud push notification event starts with the eighth event engine 104*h*, which calls an API from the API gateway 202 to send an upstream message to the tenth event process 103*j*, which comprises a Kafka™ producer library for sending a downstream message to the third Kafka™ topic 105*d*. The third Kafka™ topic stores events for subsequent transmission to and use by, for example, an event consumer 106 in the form of a fraud IT department.

The non-fraud push notification analogously starts with the seventh event engine 104*g* calling an API from the API gateway 202 to send an upstream message to the ninth event process 103*i*. As shown in FIGS. 2A and 2B, the webhook protocol is used to transfer the upstream message from the API gateway 202 to the ninth event process 103*i*. This comprises sending the upstream message, once retrieved from the API gateway 202, through a Kafka™ producer library 502 and Kafka™ topic 504 for subsequent retrieval by the ninth event process 103*i*.

The ninth event process 103*i* receives the upstream messages via a Kafka™ listener 506, which sends the messages to a push notification process 508 that filters out non-payment notifications. The remaining payment notifications are forwarded to a converter 402 in the form of a mapper, implemented using a mapping library. The depicted converter 402 maps the format of the upstream message (e.g., the JSON schema) to that of the downstream message (e.g., the Apache Avro™ schema). Following this conversion, the downstream message is sent to a Kafka™ producer library 510, which forwards individual "single send" push notifications to the second Kafka™ topic 105*b* for forwarding to downstream event consumers as appropriate. In FIG. 5B, this includes the fifth event engine 104*e*, which processed the original payment.

The fifth event engine 104*e* comprises a Kafka™ listener 512 that receives the downstream message from the second Kafka™ topic 105*b*; a notification association process 514 that associates the notification expressed as the received downstream message with the corresponding original transaction that initiated the notification (e.g., a retail purchase); and a transmission process 516 that sends the notification as another upstream message to another of the event processes 103 running on the servers 102. More particularly, in this example the fifth event engine 104*e* sends the upstream message to the sixth event process 103*f*.

Accordingly, in FIGS. 5A and 5B when a payment is processed by the fifth event engine 104*e* and is subsequently processed for payment processing by the seventh event engine 104*g*, transactional updates are sent via push notifications back to the fifth event engine 104*e* to update the servers 102 as to the end state of the transaction (e.g., whether the payment was declined, deposited into a recipient's account, etc.). As with the fraud push notification event, an event consumer in the form of the fraud IT department 502 may subsequently access the events.

As with FIGS. 4A and 4B, FIG. 5A shows how the event retry system 300 interfaces with the ninth event process 103*i* to retry delivery of initially undeliverable events. More particularly, the DLC repository 306 is communicatively coupled to the ninth event process 103*i* to receive undeliverable messages, and delivery is retried periodically by the retry process 424 as described above in respect of FIGS. 3, 4A, and 4B when the retry process 424 relays messages from the DLC repository 306 back to the ninth event process 103*i* for attempted redelivery.

Figure 6:
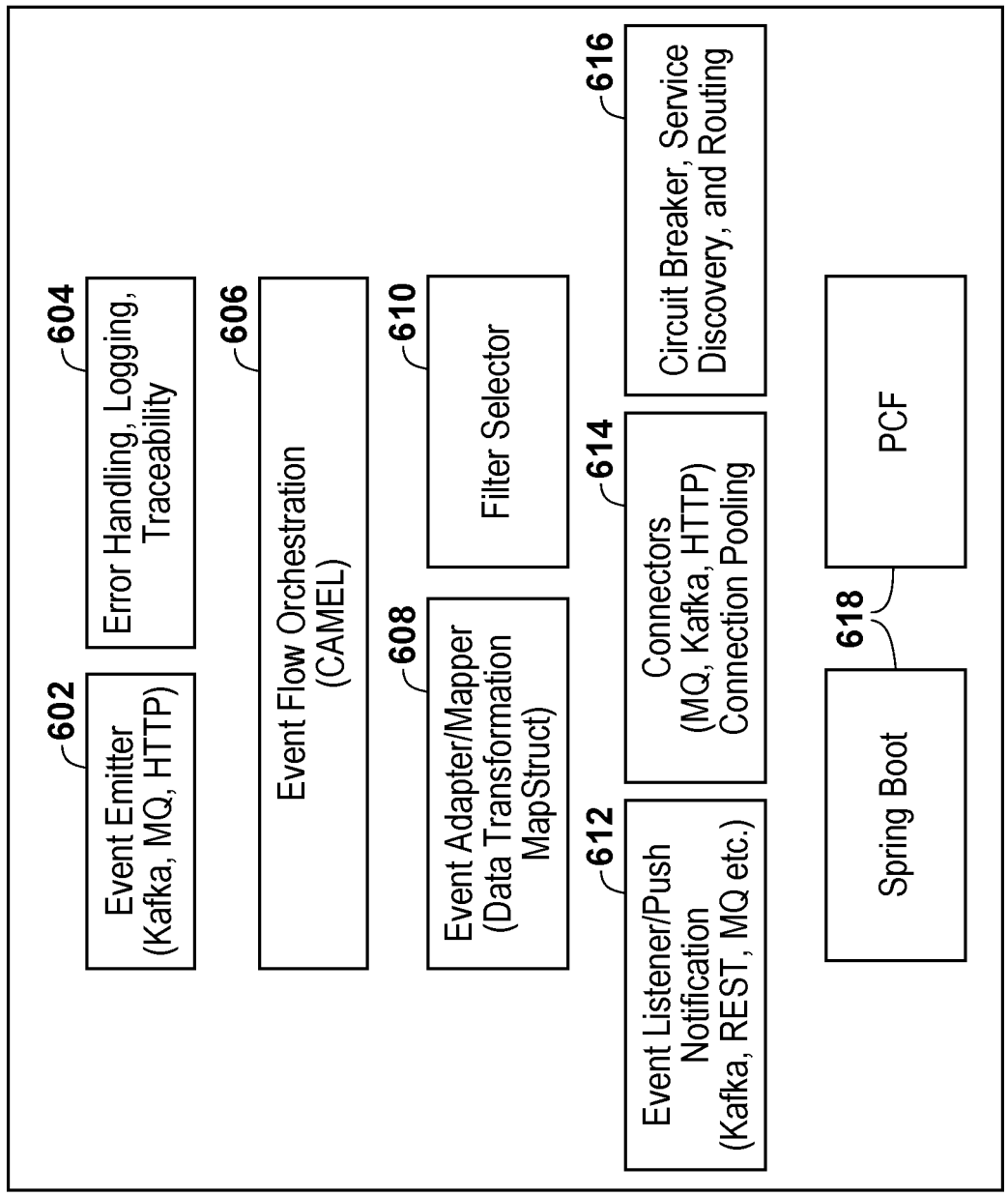
FIG. 6 is a logical block diagram depicting the technology stack used to implement the event notification system of FIG. 1.

Referring now to FIG. 6, there is depicted a logical block diagram depicting the technology stack used to implement the event notification system 10 of FIG. 1. More particularly, FIG. 6 depicts the following components:

1. An event emitter 602, which emits and publishes events using different protocols such as Kafka™, MQ, or HTTP webhook. Both the event engines 104 and the event processes 103 running on the servers 102 have their own event emitters 602.
2. An error handling, logging, and traceability module 604, which supports system error handling, logging, and end-to-end traceability requirements.
3. An event flow orchestration module 606, which supports the chain of responsibility during event enrichment or data transformation by leveraging Apache Camel™ routing functionality.
4. An event adapter/mapper module 608, which handles data transformation between a given source topic event (e.g., an event sent to the servers 102 by one of the event engines 104 via an upstream message) and a target topic event (e.g., an event sent to the Kafka™ topics 105 via a downstream message), for example by leveraging MapStruct™
5. A filter/selector module 610, which uses domain-specific language such as an Expression Language or Kafka™-based KSQL to perform filtering or selection logic.
6. An event listener/push notification module 612, which listens and consumes events from a topic, queue, or event push webhook endpoint. The event listener/push notification module 612 sits within the servers 102 where it listens and consumes messages from the event engines 104 via Kafka™ or MQ messages, for example, as depicted in FIGS. 2A and 2B.
7. A connectors and connection pooling module 614, which provides connection pooling for better performance and throughput when managing different types of connectors (e.g., JMS/MQ, Kafka™, HTTP) leveraging Apache Camel™ components.
8. A circuit breaker, service discovery, and routing module 616, which handles back-end connectivity availability, throttling, and resiliency leveraging the ability of the Spring Boot™ and Pivotal Cloud Foundry™ (PCF) modules 618 described below.
9. Spring Boot™ and PCF modules 618, which are a foundation framework and platform for a Java™ Cloud native application, which is what the event processes 103 are run as.

The above listed components are run on the servers 102 and, more particularly, used to implement the event processes 103.

As mentioned above, the event processes 103 receive from the event engines 104 upstream messages in a variety of message formats in response to events processed by the engines 104, and then standardize those messages into any one or more formats and route them to the appropriate Kafka topic 105 or downstream consumer 106 as downstream messages. Table 1, below, shows engines 104 and message protocols and formats for example upstream messages, and the corresponding message formats of the downstream messages after transformation by the servers 102.

TABLE 1

| Upstream and Downstream Message Formats | | | |
|---|---|---|---|
| Source System | Source Event Protocol | Source Event data Format (Upstream Message Format) | Standardized Event Entity Data in Payment Domain Kafka Topics (Downstream Message Format) |
| A first example embodiment of the first event engine 104a | MQ | Custom XML | ISO pain.013, pain.014, camt.052 |
| Second event engine 104b | MQ | COBOL | Flattened JSON |
| Third event engine 104c | Kafka ™ | Interbank Network ISO | ISO pacs.008, pacs.002 |
| Fourth event engine 104d | MQ | Custom | ISO pacs.002 |
| Fifth event engine 104e | MQ | Custom XML | ISO pain.001, pain.002, pacs.008, pacs.002 |
| A second example embodiment of the first event engine 104a | MQ | Custom XML | ISO pain.001, pain.002, pacs.008, pacs.002, camt.052 |

Figure 7A:
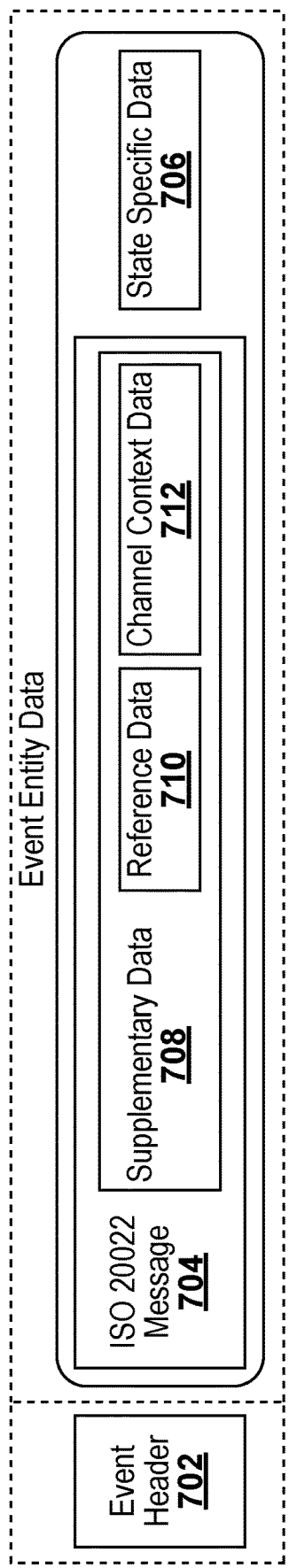
FIGS. 7A and 7B show two different example downstream message formats for ISO-based based payment events (FIG. 7A) and non-ISO based events (FIG. 7B).
Figure 7B:
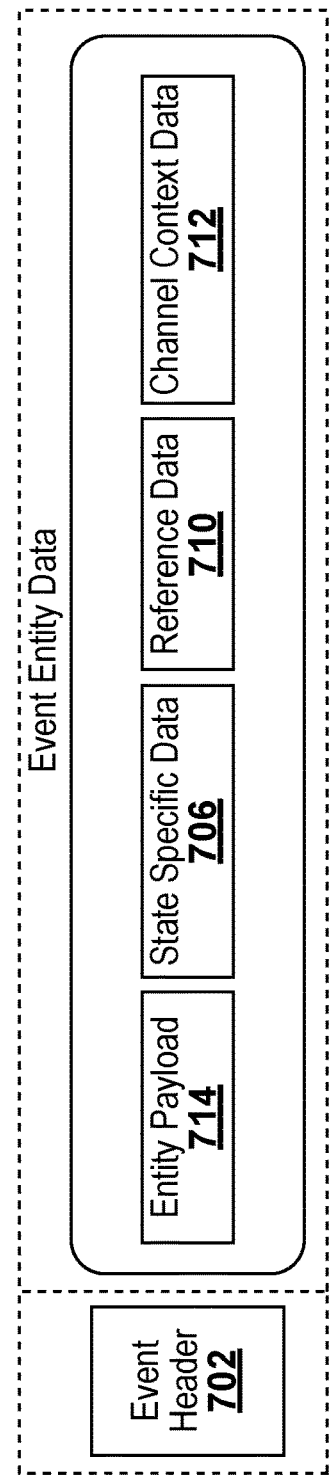

Referring now to FIGS. 7A and 7B, there are shown two different example downstream message formats for ISO-based payment events (FIG. 7A) and non-ISO based events (FIG. 7B). When the event processes 103 receive an upstream message in connection with an event related to payment processing and produced by a payment processing engine that supports the ISO 20022 standard (e.g., the first through tenth event engines 104*a-j*), the event processes 103 transform the format of the received upstream message into the ISO-based payment event structure for the downstream message as shown in FIG. 7A. Otherwise, the event processes 103 transform the downstream message as the non-ISO-based event structure of FIG. 7B.

In FIG. 7A, the ISO-based event structure comprises an event header 702 concatenated with event entity data. The event entity data comprises an ISO 20022 message 704 and state specific data 706. The ISO 20022 message 704 comprises supplementary data 708. The supplementary data 708 comprises reference data 710 and channel context data 712. In contrast, in FIG. 7B, the non-ISO-based event structure lacks the ISO 20022 message 704. Rather, the non-ISO-based event structure comprises the event header 702 concatenated with the event entity data, which comprises an entity payload 714, the state specific data 706, the reference data 710, and the channel context data 712. Each of the ISO 20022 message 704, the supplementary data 708, the reference data 710, and the channel context data 712 is as described in the ISO 20022 standard, while the state specific data 706 captures status of a payment during its lifecycle.

For "initiated" state events (i.e., an event that is initiated in response to a transaction being received by one of the engines 104), the original payment or entity payload is included in the event payload with a corresponding ISO message schema (e.g. pain.013, pain.001, pacs.008). The payload of the upstream message accordingly forms the payload of the ISO 20022 message 704. For "intermediate" state events (i.e., an event that provides an update on an event that has already been initiated that has yet to reach its final state), only state specific data (e.g., status updates from an interbank network such as when a payment expires) is included in the event payload with a corresponding ISO message schema (acknowledgement or reporting schema with subset data elements including key reference ids and status, e.g. pain.014, pain.002, pacs.002). For "final" state events (i.e., events that cause the transaction to reach its end state, such as a payment being received by a recipient and therefore completed, or a payment being cancelled), which can only be determined by the event engines 104 as they are the ones that have access to transactional information that results in event emission, the original payment or entity information in addition to final state information is included in the event payload with corresponding ISO message schema (acknowledgement or reporting schema with full data elements including original payment info and status, such as pain.014, pain.002, and pacs.002).

In the message formats of FIGS. 7A and 7B, the event header 702 comprises part of every message, while the remaining fields are optional. Example fields for the event header 702 comprise any one or more of the following:

1. EventID: this is a universal unique identifier generated by payment events identifying the event in question.
2. EventEntityType: this describes the type of entity (i.e., a particular instance of an event), such as "payment", "profile", or "contacts".
3. EventClassification: this provides a classification of entity. For example, if EventEntityType is "payment", then EventClassification may be "eTransfer", "SWIFT", or "AFT".
4. EventClassificationType: this provides a type for EventClassification. For example, if EventEntityType is "payment", then EventClassificationType may be "SendMoney", "Request Money", "bulkSendMoney", "bulkRequestMoney", or the like.
5. Operation: this describes an operation performed in connection with the event. For example, if EventEntityType is "payment", then the operation may be Send, Update, or Cancel. As another example, if EventEntityType is "Profile", then the operation may be Create, Update, or Delete.
6. Category: this indicates a category of information being transmitted by the message. For example, if EventEntityType is "payment", then the category may be "file level" or "transaction level".
7. EventEntityID: this is the identifier of the entity from the source system (i.e., the engines 104).
8. EventActivity: this is the overall status of the transaction precipitating the event: in progress, completed, cancelled, or rejected.
9. EventSubActivity: This represents the main trigger/ reasoning for the event being emitted.
10. SchemaVersion: This is the version of the schema of the message in the schema registry.
11. EventTimestamp: This is the time when the source system generated the event.
12. SourceAppCode: This represents the application code of the engines 104.
13. SourceSystemName: This is the name of the source system that generated the event.
14. ChannelID: This represents the channel (e.g., retail, commercial) that initiated the transaction that precipitated the event.
15. EventStatus: This represents the status of the event (e.g., in respect of a payment, profile, or contact) during its lifecycle.

Figure 8:
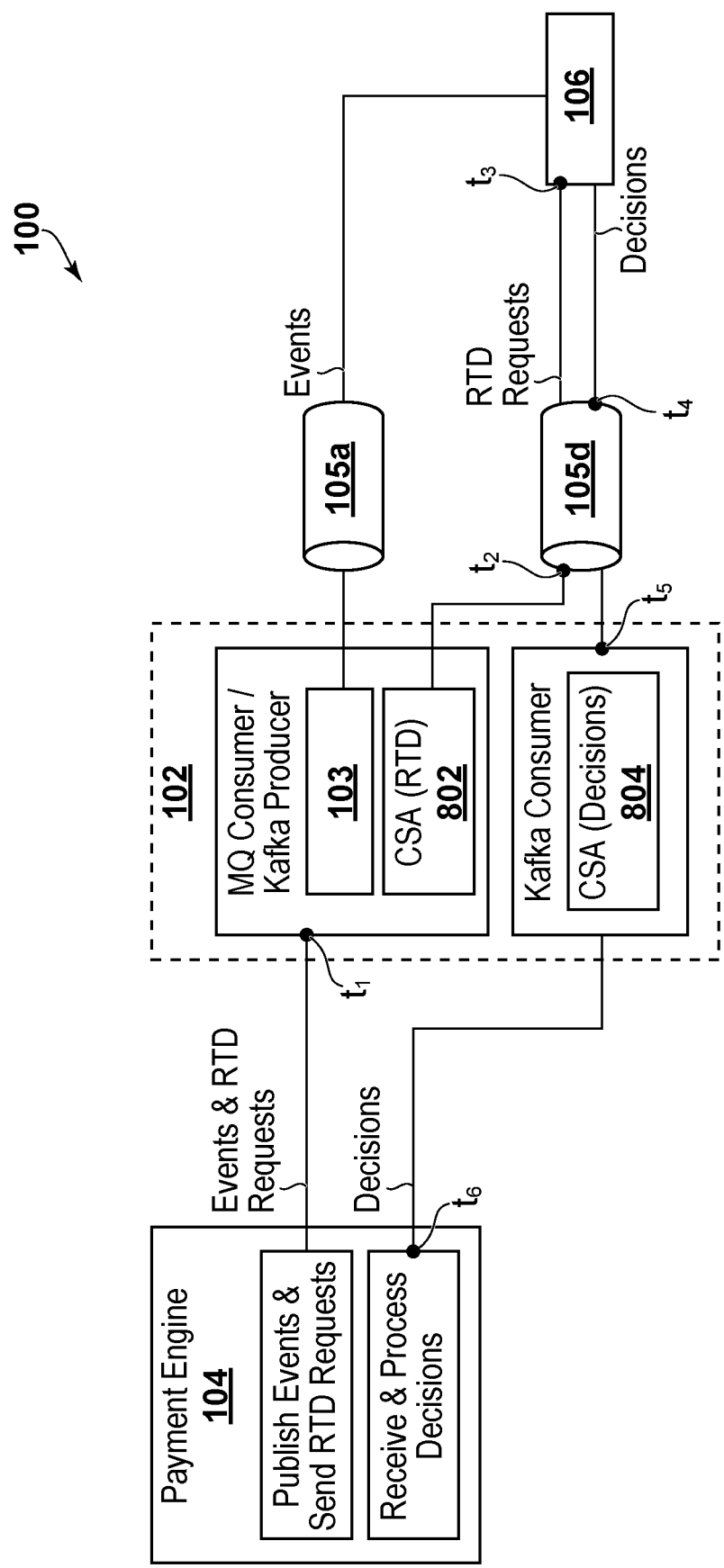
FIG. 8 is block diagram of the event notification system of FIG. 1.

Referring now to FIG. 8, there is depicted another embodiment of the event notification system 100. In addition to depicting event processing as described above in respect of FIGS. 1 to 7, the system 100 of FIG. 8 depicts bi-directional communication between the event engines 104 and event consumers 106 in respect of an "RTD" request, which is a "Real-Time Decisioning" request that is sent downstream to obtain a decision in real-time on whether or not to proceed with a transaction.

In respect of the RTD request, the servers 102 receive the request (time $t_1$) from the event engines 104 and a core system adapter ("CSA") process 802 processes the RTD request in a manner similar to how the event processes 103 process events. The CSA process 802 sends a downstream message comprising the RTD request to a fourth Kafka™ topic 105d (time $t_2$) in this example for retrieval by one of the downstream event consumers 106. The event consumer 106 retrieves this downstream message from the fourth Kafka™ topic 105d (time $t_3$) and performs appropriate analysis, such as for event sequencing and to determine whether there are any duplicate events and event eligibility; in the depicted example, the fourth Kafka™ topic 105d determines whether the event corresponds to a fraudulent payment and should accordingly not be processed. One or more decisions resulting from that analysis are sent from the event consumer 106 back to the fourth Kafka™ topic 105d (time t 4), which sends them back to a CSA decision process 804 running on the servers 102 (time t 5). The CSA decision process 804 converts the response generated by the event consumer 106 in the form of the Kafka™ message received from the fourth Kafka™ topic 105d into MQ format, again in a manner analogous to the conversion performed by the event processes 103, and sends the MQ message upstream back to the engine 104. The engine 104 subsequently receives and processes that message (time t 6) and takes appropriate action.

In contrast to the event processing done by the event engines 104 in respect of a non-RTD request, when processing an RTD request the engines 104 also correlate the RTD response to its corresponding RTD request, and also confirm that the RTD response is received within a certain time period after the RTD request is sent. This is in contrast to the event processing done for non-RTD requests as described above in respect of FIGS. 1 to 7, in which the engines 104 send the upstream message asynchronously and do not necessarily wait for any response; i.e., in respect of non-RTD event processing, the engines 104 may operate using a "fire and forget" paradigm. In this regard, FIG. 8 also shows the event processes 103 and the first Kafka™ topic 105a, which are used to transmit upstream and downstream messages as described above in respect of FIGS. 1 to 7.

The RTD response received by the engines 104 may consequently trigger another event, such as a push notification event by the seventh or eighth event engines 104g,h if the RTD response indicates that a pending payment event is fraudulent. When a payment event is received by one of the payment engine 104, the processing flow as descried above in respect of FIGS. 1 to 7 is performed. One of the actions involved in that flow may be doing a risk assessment, in which the engines 104 generate a real-time decision (RTD) request to a fraud system. The fraud system evaluates the RTD request with predefined rules and determines if the payment is legitimate or fraudulent, and return a RTD response/decision as described above in respect of FIG. 8. The decision (accept or reject, or pend) will trigger the payment engine to move the payment to next step of the process.

For example, an RTD request may occur when a payment event is pending processing by one of the event engines 104, such as the third event engine 104*c* that processes real-time payments. Prior to processing the payment event, the third event engine 104*c* may assess the risk that the payment is fraudulent. To assess this risk, the event engine 104*c* sends an RTD request to the fourth event consumer 106*d*, which assesses fraud risk. The RTD request is processed as described above, and the event engine 104*c* accordingly receives a response in real-time regarding whether the payment event is legitimate or fraudulent. If the payment event is legitimate, the event engine 104*c* proceeds to process the payment event as described above in respect FIGS. 1 to 7. If the payment event is fraudulent, then the eighth event engine 104*h* may consequently generate a fraud push event notification to send a fraud alert to a service provider or customer. Alternatively, if the payment event is legitimate, the seventh event engine 104*g* may instead generate a non-fraud push event notification to notify the customer that the payment has been approved.

In at least some of the embodiments described herein, such as in FIG. 8, when events are published from the event engines 104 (i.e., when the event engines 104 sends upstream messages), the message producers are configured to prevent message loss. For example, when the event engines 104 send Kafka™ messages, the ack=all flag is set to ensure the Kafka™ message is received before proceeding. This is in contrast to a situation where the message may be lost due to connection failures or a Kafka™ outage.

Figure 9:
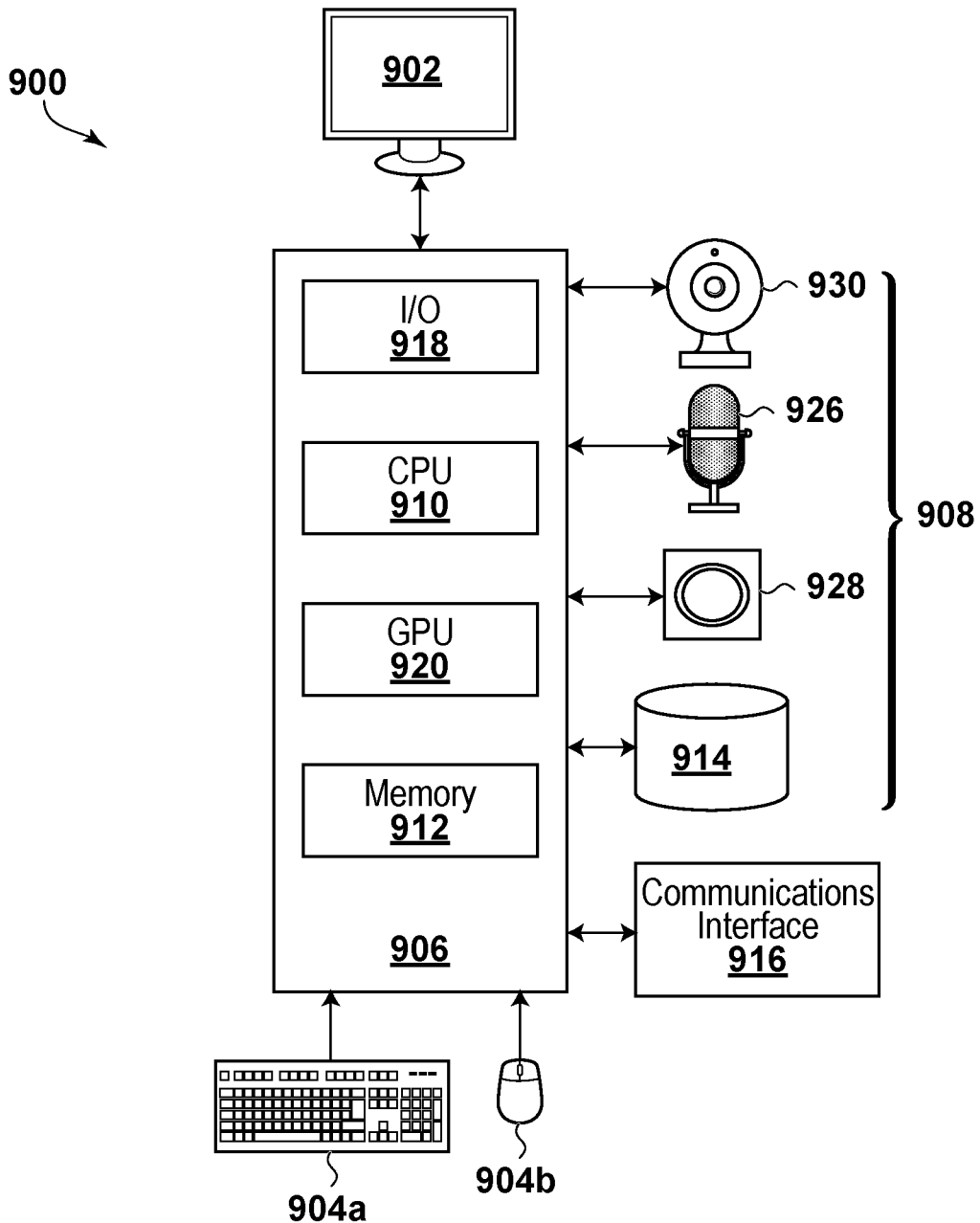
FIG. 9 depicts an example computer system that may be used as servers, event engines, or event consumers of the event notification system of FIG. 1.

An example computer system in respect of which the technology herein described may be implemented is presented as a block diagram in FIG. 9. The example computer system is denoted generally by reference numeral 1100 and includes a display 902, input devices in the form of keyboard 904A and pointing device 904B, computer 906 and external devices 908. While pointing device 904B is depicted as a mouse, it will be appreciated that other types of pointing device, or a touch screen, may also be used.

The computer 906 may contain one or more processors or microprocessors, such as a central processing unit (CPU) 910. The CPU 910 performs arithmetic calculations and control functions to execute software stored in a non-transitory internal memory 912, preferably random access memory (RAM) or read only memory (ROM), and possibly additional memory 914. The additional memory 914 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 914 may be physically internal to the computer 906, or external as shown in FIG. 9, or both.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal or additional memory 914 for execution by the one or more processors or microprocessors.

The computer system 900 may also include other similar means for allowing computer programs or other instructions to be loaded. Such means can include, for example, a communications interface 916 which allows software and data to be transferred between the computer system 900 and external systems and networks. Examples of communications interface 916 can include a modem, a network interface such as an Ethernet card, a wireless communication interface, or a serial or parallel communications port. Software and data transferred via communications interface 916 are in the form of signals which can be electronic, acoustic, electromagnetic, optical or other signals capable of being received by communications interface 916. Multiple interfaces, of course, can be provided on a single computer system 900.

Input and output to and from the computer 906 is administered by the input/output (I/O) interface 918. This I/O interface 918 administers control of the display 902, keyboard 904A, external devices 1108 and other such components of the computer system 900. The computer 906 also includes a graphical processing unit (GPU) 920. The latter may also be used for computational purposes as an adjunct to, or instead of, the (CPU) 910, for mathematical calculations.

The external devices 908 include a microphone 926, a speaker 928 and a camera 930. Although shown as external devices, they may alternatively be built in as part of the hardware of the computer system 900.

The various components of the computer system 900 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a server" or "the server" does not exclude embodiments in which multiple servers are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections.

Terminology such as or analogous to "at least one of A, B, and C" or "one or more of A, B, and C" means A alone, B alone, C alone, A and B together, A and C together, B and C together, and A, B, and C together, unless otherwise expressly indicated. Additionally, any disjunctive word or phrase such as "or" presenting two or more alternative terms may mean any one of the terms or all of the terms. For example, the phrase "A or B" may mean A alone, B alone, or A and B together.

It is contemplated that any part of any aspect or embodiment discussed in this specification can be implemented or combined with any part of any other aspect or embodiment discussed in this specification, so long as such implementation or combination is not performed using mutually exclusive parts.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method for event notification, the method comprising:
 (a) receiving an upstream message corresponding to an event in a first format from an event engine, wherein the upstream message is sent in response to the event being processed by the event engine;
 (b) converting the upstream message from the first format into a downstream message in a second format that is different from the first format; and
 (c) delivering the downstream message to an event consumer,
 wherein after receiving the upstream message from the event engine and before delivering the downstream message to the event consumer, the method further comprises:
  (i) encountering an error in processing at least one of the upstream message or the downstream message, or being unable to identify the event that corresponds to the upstream message;
  (ii) in response to the error, storing the at least one of the upstream message or the downstream message in a dead letter channel repository; and
  (iii) subsequent to the storing, retrieving the at least one of the upstream message or the downstream message from the dead letter channel repository to respectively perform at least one of the converting of the upstream message or the delivering of the downstream message.

2. The method of claim 1, wherein the error is encountered in processing the upstream message or the event that corresponds to the upstream message is unable to be identified, the upstream message is stored in the dead letter channel repository, the upstream message is retrieved from the dead letter channel repository subsequent to the storing, and the event is a payment event.

3. The method of claim 1, wherein the error is encountered in processing the downstream message, the downstream message is stored in the dead letter channel repository, the downstream message is retrieved from the dead letter channel repository subsequent to the storing, and the event is a payment event.

4. The method of claim 3, further comprising:
 (a) in response to the error, storing metadata in the dead letter channel repository identifying an application programming interface endpoint used to initially attempt delivery of the downstream message;
 (b) subsequent to the storing, retrieving the metadata identifying the application programming interface endpoint used to initially attempt delivery of the downstream message,
 wherein the downstream message is delivered to the event consumer using the application programming interface endpoint.

5. The method of claim 1, wherein:
 (a) the error is encountered in processing the upstream message or the event that corresponds to the upstream message is unable to be identified;
 (b) the error is encountered in processing the downstream message;
 (c) the upstream and downstream messages are both stored in the dead letter channel repository;
 (d) the upstream and downstream messages are both retrieved from the dead letter channel repository subsequent to the storing; and
 (e) the event is a payment event.

6. The method of claim 1, further comprising automatically and intermittently determining whether any undelivered messages are present in the dead letter channel repository, and wherein the at least one of the upstream message or downstream message is retrieved from the dead letter channel repository following identifying the at least one of the upstream message or downstream message in the dead letter channel repository in response to the automatic and intermittent determining.

7. The method of claim 1, wherein the dead letter channel repository stores a plurality of undelivered messages and metadata identifying each of the plurality of undelivered messages as being undeliverable because of a retryable error or a non-retryable error, and further comprising determining that the error is a retryable error prior to retrieving the at least one of the upstream message or downstream message from the dead letter channel repository.

8. The method of claim 1, wherein storing the at least one of upstream message or downstream message in the dead letter channel repository comprises sending the at least one of the upstream message or downstream message to the dead letter channel repository from respective upstream and downstream content-based routers, and wherein retrieving the at least one of the upstream message or downstream message from the dead letter channel repository comprises sending the at least one of the upstream message or downstream message to the upstream and downstream content-based routers, respectively, from the dead letter channel repository.

9. The method of claim 1, further comprising updating metadata stored in the dead letter channel repository describing a status of the at least one of the upstream message or downstream message and a number of times re-delivery of the at least one of the upstream message or downstream message has been attempted.

10. The method of claim 1, wherein the downstream message comprises a push notification, and further comprising generating another event in response to delivery of the push notification.

11. A system for event notification comprising:
(a) at least one processor;
(b) at least one network interface communicatively coupled to the at least one processor; and
(c) at least one non-transitory computer readable medium communicatively coupled to the processor and having stored thereon computer program code that is executable by the at least one processor, wherein the computer program code when executed causes the at least one processor to perform a method comprising:
(i) receiving via the at least one network interface an upstream message corresponding to an event in a first format from an event engine, wherein the upstream message is sent in response to the event being processed by the event engine;
(ii) converting the upstream message from the first format into a downstream message in a second format that is different from the first format; and
(iii) delivering via the at least one network interface the downstream message to an event consumer,
wherein after receiving the upstream message from the event engine and before delivering the downstream message to the event consumer, the method further comprises:
(A) encountering an error in processing at least one of the upstream message or the downstream message, or being unable to identify the event that corresponds to the upstream message;
(B) in response to the error, storing the at least one of the upstream message or the downstream message in a dead letter channel repository; and
(C) subsequent to the storing, retrieving the at least one of the upstream message or the downstream message from the dead letter channel repository to respectively perform at least one of the converting of the upstream message or the delivering of the downstream message.

12. The system of claim 11, wherein the error is encountered in processing the upstream message or the event that corresponds to the upstream message is unable to be identified, the upstream message is stored in the dead letter channel repository, the upstream message is retrieved from the dead letter channel repository subsequent to the storing, and the event is a payment event.

13. The system of claim 11, wherein the error is encountered in processing the downstream message, the downstream message is stored in the dead letter channel repository, the downstream message is retrieved from the dead letter channel repository subsequent to the storing, and the event is a payment event.

14. The system of claim 13, wherein the method further comprises:
(a) in response to the error, storing metadata in the dead letter channel repository identifying an application programming interface endpoint used to initially attempt delivery of the downstream message;
(b) subsequent to the storing, retrieving the metadata identifying the application programming interface endpoint used to initially attempt delivery of the downstream message,
wherein the downstream message is delivered to the event consumer using the application programming interface endpoint.

15. The system of claim 11, wherein:
(a) the error is encountered in processing the upstream message or the event that corresponds to the upstream message is unable to be identified;
(b) the error is encountered in processing the downstream message;
(c) the upstream and downstream messages are both stored in the dead letter channel repository;
(d) the upstream and downstream messages are both retrieved from the dead letter channel repository subsequent to the storing; and
(e) the event is a payment event.

16. The system of claim 11, wherein the method further comprises automatically and intermittently determining whether any undelivered messages are present in the dead letter channel repository, and wherein the at least one of the upstream message or downstream message is retrieved from the dead letter channel repository following identifying the at least one of the upstream message or downstream message in the dead letter channel repository in response to the automatic and intermittent determining.

17. The system of claim 11, wherein the dead letter channel repository stores a plurality of undelivered messages and metadata identifying each of the plurality of undelivered messages as being undeliverable because of a retryable error or a non-retryable error, and further comprising determining that the error is a retryable error prior to retrieving the at least one of the upstream message or downstream message from the dead letter channel repository.

18. The system of claim 11, wherein storing the at least one of upstream message or downstream message in the dead letter channel repository comprises sending the at least one of the upstream message or downstream message to the dead letter channel repository from respective upstream and downstream content-based routers, and wherein retrieving the at least one of the upstream message or downstream message from the dead letter channel repository comprises sending the at least one of the upstream message or downstream message to the upstream and downstream content-based routers, respectively, from the dead letter channel repository.

19. The system of claim 11, wherein the method further comprises updating metadata stored in the dead letter channel repository describing a status of the at least one of the upstream message or downstream message and a number of times re-delivery of the at least one of the upstream message or downstream message has been attempted.

20. At least one non-transitory computer readable medium having stored thereon computer program code that is executable by a processor, wherein the computer program code when executed causes the at least one processor to perform a method for event notification comprising:
  (a) receiving an upstream message corresponding to an event in a first format from an event engine, wherein the upstream message is sent in response to the event being processed by the event engine;
  (b) converting the upstream message from the first format into a downstream message in a second format that is different from the first format; and
  (c) delivering the downstream message to an event consumer,
wherein after receiving the upstream message from the event engine and before delivering the downstream message to the event consumer, the method further comprises:
  (i) encountering an error in processing at least one of the upstream message or the downstream message, or being unable to identify the event that corresponds to the upstream message;
  (ii) in response to the error, storing the at least one of the upstream message or the downstream message in a dead letter channel repository; and
  (iii) subsequent to the storing, retrieving the at least one of the upstream message or the downstream message from the dead letter channel repository to respectively perform at least one of the converting of the upstream message or the delivering of the downstream message.

\* \* \* \* \*